(12) United States Patent
Saito

(10) Patent No.: US 8,817,814 B2
(45) Date of Patent: Aug. 26, 2014

(54) TRANSMISSION DEVICE, TRANSMISSION SYSTEM, TRANSMISSION METHOD, AND TRANSMISSION PROGRAM

(75) Inventor: Yoshihiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 224 days.

(21) Appl. No.: 12/679,656

(22) PCT Filed: Sep. 16, 2008

(86) PCT No.: PCT/JP2008/067048
§ 371 (c)(1),
(2), (4) Date: Mar. 23, 2010

(87) PCT Pub. No.: WO2009/041372
PCT Pub. Date: Apr. 2, 2009

(65) Prior Publication Data
US 2010/0214981 A1 Aug. 26, 2010

(30) Foreign Application Priority Data
Sep. 26, 2007 (JP) ................. 2007-249708

(51) Int. Cl.
*H04J 3/16* (2006.01)
*H04J 3/24* (2006.01)
(52) U.S. Cl.
USPC ......................... 370/465; 370/476
(58) Field of Classification Search
USPC .......................... 370/310, 465–476
See application file for complete search history.

(56) References Cited

U.S. PATENT DOCUMENTS

| | | | | |
|---|---|---|---|---|
| 6,956,817 B1 * | 10/2005 | Kurosawa | ..................... | 370/227 |
| 2005/0135387 A1 * | 6/2005 | Rychener et al. | ............. | 370/401 |
| 2006/0002416 A1 * | 1/2006 | Yagihashi | ..................... | 370/428 |
| 2007/0053369 A1 * | 3/2007 | Mizutani et al. | ............. | 370/401 |

FOREIGN PATENT DOCUMENTS

| | | | |
|---|---|---|---|
| JP | H09-23245 A | | 1/1997 |
| JP | 10-173658 A | | 6/1998 |
| JP | 2006202792 A | | 11/1998 |
| JP | 2000-299704 A | * | 10/2000 |
| JP | 2002-335297 A | | 11/2002 |
| JP | 2003-198634 A | | 7/2003 |
| WO | 2004-114609 A | | 12/2004 |

OTHER PUBLICATIONS

International Search Report for PCT/JP2008/067048, mailed Dec. 16, 2008.
Japanese Office Action for JP2009-534310 mailed on Jul. 11, 2012.

* cited by examiner

*Primary Examiner* — Xavier Szewai Wong
(74) *Attorney, Agent, or Firm* — Sughrue Mion, PLLC

(57) ABSTRACT

A transmission device (4*a*) characterized by having a setting unit (corresponding to a LAN mapping circuit (100*a*)) for setting each one of radio lines (1, 2) as a radio line for transmitting a frame having a specific frame structure and a radio line for transmitting a packet, and a transmission unit (corresponding to a LAN packet dividing circuit (200*a*), an E1 framing circuit (300*a*), a LAN packet reconstruction circuit (400*a*), a buffer circuit (500*a*), a selector circuit (600*a*), and a multiplexing-demultiplexing circuit (700*a*)) for transmitting the frame and the packet using the radio lines (1, 2) in accordance with information (LAN mapping information (101*a*)) set by the setting unit (100*a*).

18 Claims, 6 Drawing Sheets

TRANSMISSION DEVICE, TRANSMISSION SYSTEM, TRANSMISSION METHOD, AND TRANSMISSION PROGRAM

This application is the National Phase of PCT/JP2008/067048, filed on Sep. 16, 2008, which is based upon and claims the benefit of priority from Japanese Patent Application No. 2007-149708, filed Sep. 26, 2007, the disclosure of which is incorporated herein in its entirety by reference.

TECHNICAL FIELD

This invention relates to a transmission device, a transmission system, a transmission method, and a transmission program, and in particular relates to a transmission device, a transmission system, a transmission method, and a transmission program, which are capable of transmitting a frame having a specific frame structure and a packet with the use of a plurality of radio lines.

BACKGROUND ART

When an existing transmission device capable of transmitting E1 signals is to be additionally provided with a LAN (Local Area Network) packet transmitting function, it is necessary to change the radio frame structure or to newly introduce a device capable of transmitting LAN packets. As a result, an enormous cost is required for adding a function of transmitting LAN packets to the existing transmission device capable of transmitting E1 signals. The term "E1 signal" refers to an E1 interface signal standardized in ITU-T G.704. The term "LAN packet" refers to an interface signal standardized in IEEE802.3.

Thus, there is a demand for development of a method capable of facilitating the addition of a LAN packet transmitting function to existing transmission devices capable of transmitting E1 signals.

There exists literature disclosing a technique to transmit LAN packets using a plurality of transmission lines, regardless of E1 signals (see Patent Document 1, for example).

According to the technique described in Patent Document 1, stream data is divided in predetermined units and assigned to a plurality of transmission lines. On the other hand, information relating to these transmission lines is acquired as a transmission line list. The divided stream data and the transmission line list are sent onto the plurality of transmission lines. The divided stream data is reconstructed, on a reception side, based on the transmission line list acquired through one of the transmission lines. Referring to FIG. 6, the aforementioned processing operation disclosed in Patent Document 1 will be described.

A device shown in FIG. 6 is a device for providing information to an arbitrary device (not shown) connected to an ISDN (Integrated Services Digital Network) 64. This device includes a personal computer 50. The personal computer 50 is connected to Internet 11 through a LAN 10. The personal computer 50 is also connected to three subscriber lines 63(1), 63(2), 63(3) via terminal adapters (TAs) 61 and network terminations (NTs) 62. The three subscriber lines 63(1), 63(2), 63(3) are connected to the ISDN 64. A LAN interface 51 receives stream data from the Internet 11 through the LAN 10. A packet acquisition unit 52 extracts packet data from the stream data in units of packets. A packet sorting unit 53 sorts and assigns the packet data extracted in units of packets to the three subscriber lines 63(1), 63(2), 63(3) as transmission destinations. A transmission line list holding unit 54 holds ISDN numbers (line numbers) corresponding to the subscriber lines 63(1), 63(2), 63(3) as a transmission line list, and outputs the transmission line list to transmission line list adding units 55(1), 55(2), 55(3). The transmission line list adding units 55(1), 55(2), 55(3) add the transmission line list acquired from the transmission line list holding unit 54 to the packet data assigned by the packet sorting unit 53, and transmit the packet data to the subscriber lines 63(1), 63(2), 63(3) through interfaces 56(1), 56(2), 56(3), TAs 61(1), 61(2), 61(3), and NTs 62(1), 62(2), 62(3), respectively. In this manner, the technique described in Patent Document 1 makes it possible to divide stream data into pieces of packet data and transmit them using the plurality of subscriber lines 63(1), 63(2), 63(3).

According to the method of Patent Document 1, however, the transmission line list must always be added to the packet data sent onto each transmission line (subscriber line). Moreover, the information amount of the transmission line list is increased as the number of transmission lines to send the packet data is increased. Therefore, according to the method of Patent Document 1, the proportion occupied by packet data to be transmitted becomes smaller. As a result, according to the method of Patent Document 1, the actual throughput becomes lower than the transmission capacity of the transmission lines as the number of transmission lines to send the packet data is increased. This means that efficient transmission of packet data cannot be realized by the method of Patent Document 1.

Further, there exists literature disclosing a technique in which ATM (Asynchronous Transfer Mode) cells are mapped to E1 frame time slots, and the ATM cells are sequentially mapped and transmitted at one-multiframe cycle (see Patent Document 2, for example).

There also exists literature disclosing a technique in which signals are distributed to and transmitted through a plurality of systems having varying transmission delay time, and the distributed and transmitted signals can then be synthesized to restore the original signal (see Patent Document 3, for example).

Further, there exists literature disclosing a technique as described below (see Patent Document 4, for example).

One data frame is divided according to respective system transmission speeds to produce a plurality of data packets having an equal packet length which is equal to or less than a maximum data size. The plurality of data packets thus produced are transmitted in parallel by a plurality of radio channels, or by a single radio channel and space division multiplexing, or by a plurality of radio channels and space division multiplexing.

Patent Document 1: Japanese Laid-Open Patent Publication No. 2000-299704
Patent Document 2: Japanese Laid-Open Patent Publication No. H10-173658
Patent Document 3: Japanese Laid-Open Patent Publication No. 2002-335297
Patent Document 4: WO2004/114609

DISCLOSURE OF THE INVENTION

However, none of the above-mentioned Patent Documents 1 to 4 describes or suggests a technique in which each one of radio lines is set as a radio line for transmitting frames having a specific frame structure or a radio line for transmitting packets, so that the frames and the packets are transmitted using a plurality of radio lines according to information of the setting, nor even suggests the necessity of such technique.

Furthermore, according to the techniques described in Patent Documents 1 to 4, the mixture ratio between packet transmitting radio lines and frame transmitting radio lines cannot be changed dynamically during transmission of packets.

This invention has been made in view of these circumstances to solve the aforementioned problem, and it is an object of the invention to provide a transmission device, a transmission system, a transmission method, and a transmission program which are capable of dynamically changing the mixture ratio between packet transmitting radio lines and frame transmitting radio lines during transmission of packets.

In order to achieve the object, this invention has characteristics as described below.

Transmission Device:

A transmission device according to this invention is a transmission device for transmitting a frame having a specific frame structure and a packet with the use of a plurality of radio lines, and is characterized by having setting means for setting each one the radio lines as a frame transmitting radio line or a packet transmitting radio line, and transmission means for transmitting the frame and the packet with the use of the radio lines according to information set by the setting means.

Transmission System:

A transmission system according to this invention is a transmission system formed by a pair of transmission devices mutually connected through a plurality of radio lines, and is characterized in that each of the transmission devices has setting means for setting each one of the radio lines as a frame transmitting radio line or a packet transmitting radio line, and transmission means for transmitting the frame and the packet with the use of the radio lines according to information set by the setting means.

Transmission Method:

A transmission method according to this invention is a transmission method for transmitting a frame having a specific frame structure and a packet with the use of a plurality of radio lines, and is characterized by including a setting step of setting each one the radio lines as a frame transmitting radio line or a packet transmitting radio line, and a transmission step of transmitting the frame and the packet with the use of the radio lines according to information set in the setting step.

Transmission Program Recording Medium:

A computer-readable transmission program recording medium according to this invention is a recording medium on which a transmission program for transmitting a frame having a specific frame structure and a packet with the use of a plurality of radio lines is recorded, and is characterized in that the transmission program recorded thereon causes a computer to execute setting processing for setting each one the radio lines as a frame transmitting radio line or a packet transmitting radio line, and transmission processing for transmitting the frame and the packet with the use of the radio lines according to information set by the setting processing.

Advantageous Effects of the Invention

According to this invention, the mixture ratio between packet transmitting radio lines and frame transmitting radio lines can be dynamically changed during transmission of packets.

BEST MODE FOR CARRYING OUT THE INVENTION

Exemplary embodiments of this invention will be described in detail with reference to the drawings.

First, referring to FIG. 1, schematic description will be made of a transmission system according to a first embodiment of the invention.

Figure 1:
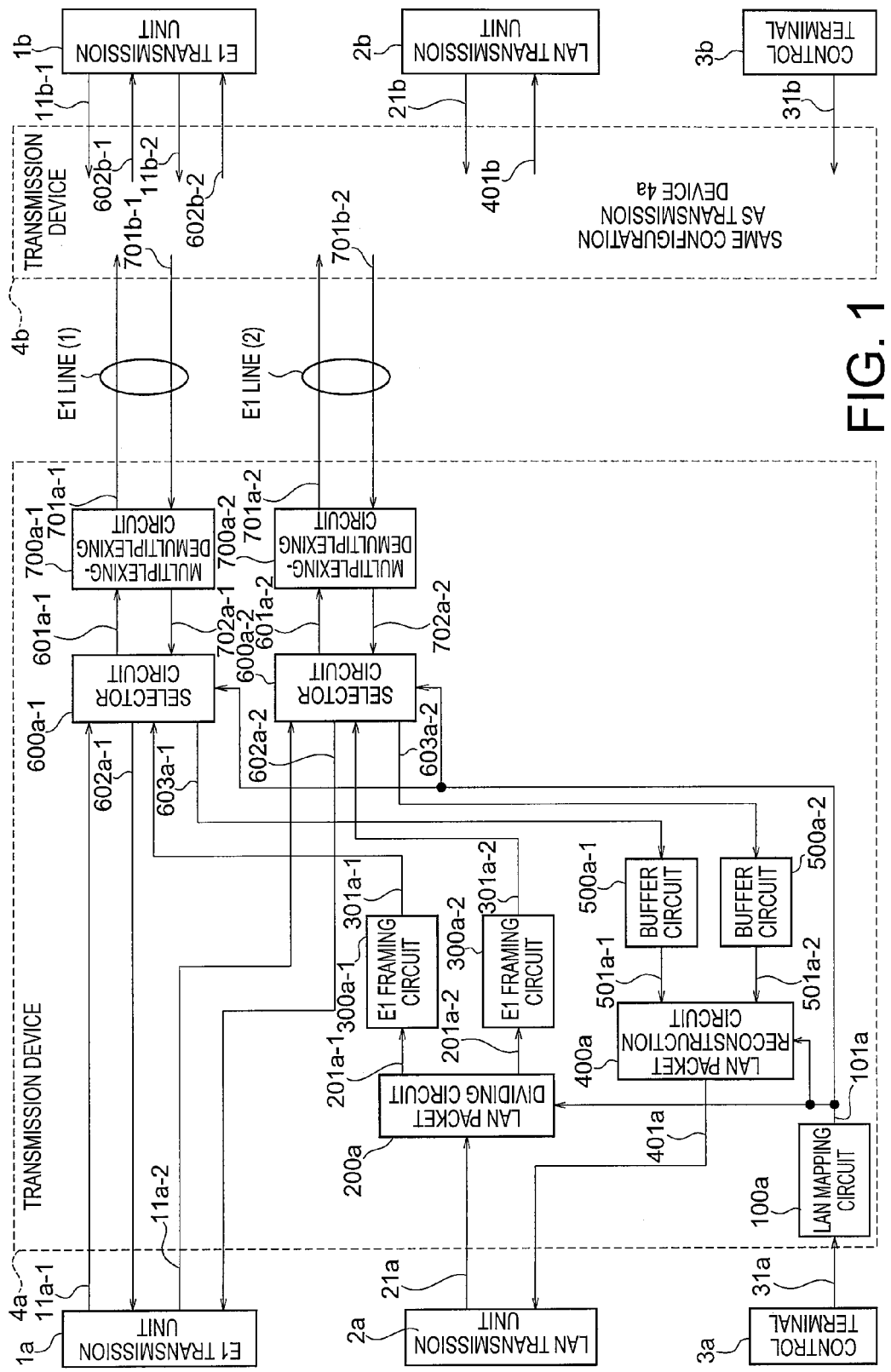
FIG. 1 is a diagram showing an example of a system configuration of a transmission system according to an embodiment of this invention.

The transmission system according to this embodiment includes a pair of transmission devices 4a and 4b as shown in FIG. 1. In other words, this transmission system is formed by connecting the first transmission device 4a and the second transmission device 4b through a plurality of radio lines 1 and 2.

The transmission device 4a according to this embodiment is characterized by having setting means (corresponding to a LAN mapping circuit 100a) for setting each of radio lines 1 and 2 as a radio line for transmitting frames having a specific frame structure (e.g. E1 frames) and a radio line for transmitting packets (e.g. LAN packets), and transmission means (corresponding to a LAN packet dividing circuit 200a, E1 framing circuits 300a-1 and 300a-2, a LAN packet reconstruction circuit 400a, buffer circuits 500a-1 and 500a-2, selector circuits 600a-1 and 600a-2, and multiplexing-demultiplexing circuits 700a-1 and 700a-2) for transmitting frames and packets with the use of the radio lines 1 and 2 according to information (LAN mapping information 101a) set by the setting means (100a). The transmission device 4b is configured in the same manner as the transmission device 4a.

This configuration enables the transmission system of this embodiment to dynamically change the mixture ratio between the frame transmitting radio lines and the packet transmitting radio lines during transmission of packets. The transmission system of this embodiment will be described in detail with reference to the accompanying drawings.

System Configuration of the Transmission System:

First, referring to FIG. 1, a system configuration of the transmission system according to this embodiment will be described.

As shown in FIG. 1, the transmission system according to this embodiment is formed by connecting the first transmission device 4a and the second transmission device 4b through the E1 lines 1 and 2. It should be noted that the number of the E1 lines is not limited to two (E1 lines 1 and 2) as shown in FIG. 1, but may be three or more. The transmission devices 4a and 4b can be mutually connected through a plurality of E1 lines, regardless of the number of the E1 lines. The term "E1 line" refers to a radio line used for transmission of E1 interface signals (E1 signals) standardized in ITU-T G.704.

The transmission device 4a (or 4b) according to this embodiment is a transmission device having an interface function with an E1 transmission unit 1a (or 1b), a LAN transmission unit (or 2b), and a control terminal 3a (or 3b). The E1 transmission units 1a and 1b are units having a function of transmitting E1 signals. The LAN transmission units 2a and 2b are units having a function of transmitting LAN signals. The control terminals 3a and 3b are units having a function of controlling the respective radio lines of the transmission devices 4a and 4b.

Internal Configuration of Transmission Devices 4a and 4b:

Next, referring to FIG. 1, description will be made of an internal configuration of the first and second transmission devices 4a and 4b according to this embodiment. It should be noted that, in this embodiment, the first transmission device 4a and the second transmission device 4b have the same internal configuration, and therefore the following description will be made only of the first transmission device 4a.

The first transmission device 4a according to this embodiment has a LAN mapping circuit 100a, a LAN packet dividing circuit 200a, a plurality of (two, in this example) E1 framing circuits 300a-1 and 300a-2, a LAN packet reconstruction circuit 400a, a plurality of (two, in this example) buffer circuits 500a-1 and 500a-2, a plurality of (two, in this example) selector circuits 600a-1 and 600a-2, and a plurality of (two, in this example) multiplexing-demultiplexing circuits 700a-1 and 700a-2.

The E1 framing circuits 300a-1 and 300a-2, the buffer circuits 500a-1 and 500a-2, the selector circuits 600a-1 and 600a-2, and the multiplexing-demultiplexing circuits 700a-1 and 700a-2 are provided in the same number as the number of E1 lines 1 and 2 (hereafter, defined as channels) laid between the transmission devices 4a and 4b, and these component circuits correspond to the respective channels in one-to-one fashion. In FIG. 1, the channel using the E1 line 1 for transmission is defined as the channel 1, and the channel using the E1 line 2 for transmission is defined as the channel 2. Although not shown in FIG. 1, the second transmission device 4b is configured in the same manner as the first transmission device 4a.

LAN Mapping Circuit 100a:

When receiving a radio line setting signal 31a from the control terminal 3a, the LAN mapping circuit 100a determine a channel to be used as the LAN signal transmission line (LAN transmission line) from the E1 lines 1 and 2 laid between the transmission devices 4a and 4b, on the basis of the radio line setting signal 31a. The radio line setting signal 31a is a signal for determining a channel to be used as the LAN transmission line. The LAN mapping circuit 100a generates LAN mapping information 101a on the basis of the channel to be used as the LAN transmission line, and outputs the generated LAN mapping information 101a to the LAN packet dividing circuit 200a, the LAN packet reconstruction circuit 400a, and the selector circuits 600a-1 and 600a-2. The LAN mapping information 101a contains information used for specifying the channel to be used as the LAN transmission line.

LAN Packet Dividing Circuit 200a:

When receiving a LAN signal (LAN packet) 21a from the LAN transmission unit 2a, the LAN packet dividing circuit 200a divides the LAN signal 21a in one-byte units to generate divided packets 201a-1 and 201a-2. Then, the LAN packet dividing circuit 200a specifies channels to be used as the LAN transmission lines, on the basis of the LAN mapping information 101a received from the LAN mapping circuit 100a. The LAN packet dividing circuit 200a then outputs the divided packets 201a-1 and 201-2 to the E1 framing circuits 300a-1 and 300a-2, in ascending order of the channel numbers of the channels to be used as the LAN transmission lines.

As described above, the LAN packet dividing circuit 200a functions as dividing means for dividing a packet into a plurality of divided packets.

E1 Framing Circuit 300a-1, 300a-2:

Having received a divided packet 201a-1 (or 201a-2) from the LAN packet dividing circuit 200a, the E1 framing circuit 300a-1 (or 300a-2) multiplexes the divided packet 201a-1 (or 201a-2) on a payload region of an E1 frame format specified in ITU-T G.704 to generate an E1 frame. The E1 framing circuit 300a-1 (or 300a-2) then outputs the generated E1 frame as an E1 frame signal 301a-1 (or 301a-2) to the selector circuit 600a-1 (or 600a-2). It should be noted that the heads of the E1 frames generated by the E1 framing circuits 300a-1 and 300a-2 correspond with each other between the E1 framing circuits 300a-1 and 300a-2.

Further, the positions where the divided packets 201a-1 and 201a-2 are multiplexed into an E1 frame correspond with each other between the E1 framing circuits 300a-1 and 300a-2.

As described above, the E1 framing circuit 300a-1 (and 300a-2) functions as framing means for multiplexing packets divided by the dividing means into a frame to generate a packet of a specific frame structure.

LAN Packet Reconstruction Circuit 400a:

The LAN packet reconstruction circuit 400a specifies channels to be used as LAN transmission lines on the basis of the LAN mapping information 101a received from the LAN mapping circuit 100a. The LAN packet reconstruction circuit 400a then reads out buffer readout signals 501a-1 and 501a-2 in one-byte units respectively from the buffer circuits 500a-1 and 500a-2 in ascending order of the channel numbers of the channels to be used as the LAN transmission lines. Then, the LAN packet reconstruction circuit 400a reconstructs an original LAN signal (LAN packet) before the division on the basis of the buffer readout signals 501a-1 and 501a-2 read out from the buffer circuits 500a-1 and 500a-2, and outputs the reconstructed signal to the LAN transmission unit 2a as a LAN reconstruction signal 401a.

As described above, the LAN packet reconstruction circuit 400a functions as reconstruction means for regenerating a packet based on the divided packets stored in the storing means.

Buffer Circuit 500a-1, 500a-2:

The buffer circuit 500a-1 (or 500a-2) extracts data of the payload region from the LAN channel signal 603a-1 (or 603a-2) having the E1 frame structure, and writes the extracted data in an internal buffer (not shown). The data written in the internal buffer is output in one-byte units to the LAN packet reconstruction circuit 400a as a buffer readout signal 501a-1 (or 501a-2), in response to an acquisition request from the LAN packet reconstruction circuit 400a. Since synchronization of the E1 frames of the LAN channel signals 603a-1 and 603a-2 has been achieved between the multiplexing-demultiplexing circuits 700a-1 and 700a-2, the position where data is extracted from the LAN channel signals 603a-1 and 603a-2 and the position (address) where the data is written into the internal buffer corresponds with each other between the buffer circuits 500a-1 and 500a-2.

As described above, the buffer circuit 500a-1 (and 500a-2) functions as storing means for extracting divided packets from the frame transmitted from the switching means and storing the extracted divided packets therein.

Selector Circuit 600a-1, 600a-2:

The selector circuit 600a-1 (or 600a-2) specifies channels to be used as LAN transmission lines on the basis of the LAN mapping information 101a received from the LAN mapping circuit 100a. If the selector circuit 600a-1 (or 600a-2) determines that the channel corresponding to the selector circuit 600a-1 (or 600a-2) is to be used as an E1 transmission line, the selector circuit 600a-1 (or 600a-2) outputs an E1 input signal 11a-1 (or 11a-2) received from the E1 transmission unit 1a to the multiplexing-demultiplexing circuit 700a-1 (or 700a-2) as a multiplexed signal 601a-1 (or 601a-2). Further, the selector circuit 600a-1 (or 600a-2) outputs a demultiplexed signal 702a-1 (or 702a-2) received from the multiplexing-demultiplexing circuit 700a-1 (or 700a-2) to the E1 transmission unit 1a as an E1 output signal 602a-1 (or 602a-2).

If the selector circuit 600a-1 (or 600a-2) determines that the channel corresponding to the selector circuit 600a-1 (or 600a-2) is to be used as a LAN transmission line, the selector circuit 600a-1 (or 600a-2) outputs an E1 frame signal 301a-1 (or 301a-2) received from the E1 framing circuit 300a-1 (or 300a-2) to the multiplexing-demultiplexing circuit 700a-1 (or 700a-2) as a multiplexed signal 601a-1 (or 601a-2). Further, the selector circuit 600a-1 (or 600a-2) outputs a demultiplexed signal 702a-1 (or 702a-2) received from the multiplexing-demultiplexing circuit 700a-1 (or 700a-2) to the buffer circuit 500a-1 (or 500a-2) as a LAN channel signal 603a-1 (or 603a-2).

As described above, the selector circuit 600a-1 (and 600a-2) functions as switching means for switching the E1 line 1 (radio line) to the frame transmitting radio line or the packet transmitting radio line. Specifically, the selector circuit 600a-1 (and 600a-2) functions as switching means for transmitting a frame transmitted from the frame transmission means to the frame transmitting radio line, and transmitting a packet of a specific frame structure transmitted from the packet transmission means to the packet transmitting radio line. Further, the selector circuit 600a-1 (and 600a-2) functions as switching means for transmitting a frame transmitted through the frame transmitting radio line to the frame transmission means, and transmitting a frame transmitted through the packet transmitting radio line (i.e. a packet of a specific frame structure) to the packet transmission means. The frame transmission means as used herein consists of lines connecting the selector circuits 600a-1 and 600a-2 to the E1 transmission unit 1a. The packet transmission means consists of lines and circuits connecting the selector circuits 600a-1 and 600a-2 to the E1 transmission unit 1a. This means that the LAN packet dividing circuit 200a, the E1 framing circuits 300a-1 and 300a-2, the LAN packet reconstruction circuit 400a, and the buffer circuits 500a-1 and 500a-2 together function as the packet transmission means.

Multiplexing-Demultiplexing Circuit 700a-1, 700a-2:

The multiplexing-demultiplexing circuit 700a-1 (or 700a-2) multiplexes the multiplexed signal 601a-1 (or 601a-2) received from the selector circuit 600a-1 (or 600a-2) on a payload region of a radio frame and outputs the same to the E1 line 1 (or 2) as a radio transmission signal 701a-1 (or 701a-2). Further, the multiplexing-demultiplexing circuit 700a-1 (or 700a-2) extracts a multiplexed signal multiplexed by a multiplexing-demultiplexing circuit (not shown) of the transmission device 4b from the payload region of the radio transmission signal 701b-1 (or 701b-2) received through the E1 line 1 (or 2) from the transmission device 4b. After achieving synchronization of E1 frames with the other multiplexing-demultiplexing circuit 700a-2 (or 700a-1), the multiplexing-demultiplexing circuit 700a-1 (or 700a-2) outputs the extracted multiplexed signal to the selector circuit 600a-1 (or 600a-2) as a demultiplexed signal 702a-1 (or 702a-2).

Processing Operation in Transmission System:

Next, referring to FIG. 1, detailed description will be made of a series of processing operations in the transmission system according to this embodiment. It should be noted that, in the following description, the components of the transmission device 4b are assigned with reference numerals obtained by replacing "a" in the reference numerals assigned to the components of the transmission device 4a with "b". For example, the LAN mapping circuit of the transmission device 4b is represented as the "LAN mapping circuit 100b".

When the LAN mapping circuit 100a of the transmission device 4a receives a radio line setting signal 31a from the control terminal 3a, the LAN mapping circuit 100a determines channels to be used as a LAN transmission line from the E1 lines 1 and 2 laid between the transmission devices 4a and 4b, on the basis of the radio line setting signal 31a. The LAN mapping circuit 100a then generates LAN mapping information 101a on the basis of the channel to be used as the LAN transmission line, and outputs the generated LAN mapping information 101a to the LAN packet dividing circuit 200a, the LAN packet reconstruction circuit 400a, and the selector circuits 600a-1 and 600a-2.

The channels selected from the E1 lines 1 and 2 to be used as the LAN transmission line by the transmission device 4a should correspond with the channels selected by the transmission device 4b. This means that the radio line setting signals 31a and 31b output by the control terminals 3a and 3b are the same signal, and the LAN mapping information 101a and 101b output by the LAN mapping circuits 100a and 100b are the same information.

Having received the LAN mapping information 101a from the LAN mapping circuit 100a, the LAN packet dividing circuit 200a specifies channels to be used as LAN transmission lines on the basis of the received LAN mapping information 101a. The LAN packet dividing circuit 200a then divides the LAN signal 21a received from the LAN transmission unit 2a in one-byte units to generate divided packets 201a-1 and 201a-2. Then, the LAN packet dividing circuit 200a outputs the divided packets (201a-1 and 201a-2) to the E1 framing circuits (e.g. 300a-1 and 300a-2) in ascending order of the channel numbers of the channels to be used as the LAN transmission lines.

Having received the divided packet 201a-1 (or 201a-2) from the LAN packet dividing circuit 200a, the E1 framing circuit 300a-1 (or 300a-2) multiplexes the received divided packet 201a-1 (or 201a-2) on a payload region of an E1 frame format to generate an E1 frame. In this event, the E1 framing circuits 300a-1 and 300a-2 generate E1 frames after causing the heads of the E1 frames to correspondence with each other between the E1 framing circuits 300a-1 and 300a-2. The E1 framing circuit 300a-1 (or 300a-2) then outputs the generated E1 frame to the selector circuit 600a-1 (or 600a-2) as the E1 frame signal 301a-1 (or 301a-2).

Having received the LAN mapping information 101a from the LAN mapping circuit 100a, the selector circuit 600a-1 (or 600a-2) specifies a channel to be used as a LAN transmission line on the basis of the received LAN mapping information 101a. The selector circuit 600a-1 (or 600a-2) then selects, on the basis of the specified channel, either an E1 input signal 11a-1 (or 11a-2) received from the E1 transmission unit 1a or an E1 input signal 11a-1 (or 11a-2) received from the E1 framing circuit 301a-1 (or 301a-2), and outputs the selected signal to the multiplexing-demultiplexing circuit 700a-1 (700a-2) as a multiplexed signal 601a-1 (or 601a-2).

For example, when the selector circuit 600a-1 (or 600a-2) determines to use the selector circuit 600a-1 (or 600a-2) as the E1 transmission line on the basis of the specified channel, the selector circuit 600a-1 (or 600a-2) outputs the E1 input signal 11a-1 (or 11a-2) received from the E1 transmission unit 1a to the multiplexing-demultiplexing circuit 700a-1 (or 700a-2) as the multiplexed signal 601a-1 (or 601a-2). When the selector circuit 600a-1 (or 600a-2) determines to use the selector circuit 600a-1 (or 600a-2) itself as the LAN transmission line, the selector circuit 600a-1 (or 600a-2) outputs the E1 frame signal 301a-1 (or 300a-2) received from the E1 framing circuit 300a-1 (or 300a-2) to the multiplexing-demultiplexing circuit 700a-1 (700a-2) as the multiplexed signal 601a-1 (or 601a-2).

Having received the multiplexed signal 601a-1 (or 601a-2) from the selector circuit 600a-1 (or 600a-2), the multiplexing-demultiplexing circuit 700a-1 (or 700a-2) multiplexes the received multiplexed signal 601a-1 (or 601a-2) on a payload region of a radio frame, and outputs the same to the E1 line 1 (or 2) as a radio transmission signal 701a-1 (or 701a-2).

The multiplexing-demultiplexing circuit 700b-1 (or 700b-2) of the transmission device 4b receives the radio transmission signal 701a-1 (or 701a-2) through the E1 line 1 (or 2). Then, the multiplexing-demultiplexing circuit 700b-1 (or 700b-2) extracts the multiplexed signal 601a-1 (or 601a-2) multiplexed by the multiplexing-demultiplexing circuit 700a-1 (or 700a-2) of the transmission device 4a, from the payload region of the radio frame of the received radio transmission signal 701a-1 (or 701a-2). After achieving synchronization of the E1 frames with the other multiplexing-demultiplexing circuit 700b-2 (or 700b-2), the multiplexing-demultiplexing circuit 700b-1 (or 700b-2) outputs the extracted multiplexed signal 601a-1 (or 601a-2) to the selector circuit 600b-1 (or 600b-2) as a demultiplexed signal 702b-1 (or 702b-2).

Having received the LAN mapping information 101b from the LAN mapping circuit 100b, the selector circuit 600b-1 (or 600b-2) specifies a channel to be used as a LAN transmission line. Then, when the selector circuit 600b-1 (or 600b-2) determines, based on the specified channel, to use the selector circuit 600b-1 (or 600b-2) itself as the LAN transmission line, the selector circuit 600b-1 (or 600b-2) outputs the demultiplexed signal 702b-1 (or 702b-2) received from the multiplexing-demultiplexing circuit 700b-1 (or 700b-2) to the buffer circuit 500b-1 (or 500b-2) as a LAN channel signal 603b-1 (or 603b-2). When the selector circuit 600b-1 (or 600b-2) determines, based on the specified channel, to use the selector circuit 600b-1 (or 600b-2) as an E1 transmission line, the selector circuit 600b-1 (or 600b-2) outputs the demultiplexed signal 702b-1 (or 702b-2) received from the multiplexing-demultiplexing circuit 700b-1 (or 700b-2) to the E1 transmission unit 1b as an E1 output signal 602b-1 (or 602b-2).

The buffer circuit 500b-1 (or 500b-2) extracts data of the payload region from the LAN channel signal 603b-1 (or 603b-2) having an E1 frame structure and writes the data in its internal buffer.

The LAN packet reconstruction circuit 400b specifies channels to be used as LAN transmission lines on the basis of the mapping information 101b received from the LAN mapping circuit 100b. The LAN packet reconstruction circuit 400b then starts reading buffer readout signals 501b-1 and 501b-2 in one-byte units from the buffer circuits (e.g. 500b-1 and 500b-2) in ascending order of the channel numbers of the channels to be used as the LAN transmission line. Thus, the LAN packet reconstruction circuit 400b reads out the buffer readout signals 501b-1 and 501b-2 in one-byte units from the buffer circuit 500b-1 and 500b-2 in ascending order of the channel numbers of the channels to be used as the LAN transmission line. Then, the LAN packet reconstruction circuit 400b reconstructs the LAN signal 21a that has been divided by the LAN packet dividing circuit 200a of the transmission device 4a on the basis of the buffer readout signals 501b-1 and 501b-2 read out from the buffer circuits 500b-1 and 500b-2, and outputs the reconstructed signal to the LAN transmission unit 2b as a LAN reconstruction signal 401b.

This enables the transmission devices 4a and 4b to transmit the LAN signals 21a and 21b using a plurality of channels selected from the E1 lines 1 and 2.

E1 Frame Format:

Next, referring to FIG. 2, description will be made of an E1 frame format standardized in ITU-T G.704, and a payload region on which the divided packet 201a is multiplexed.

Figure 2:
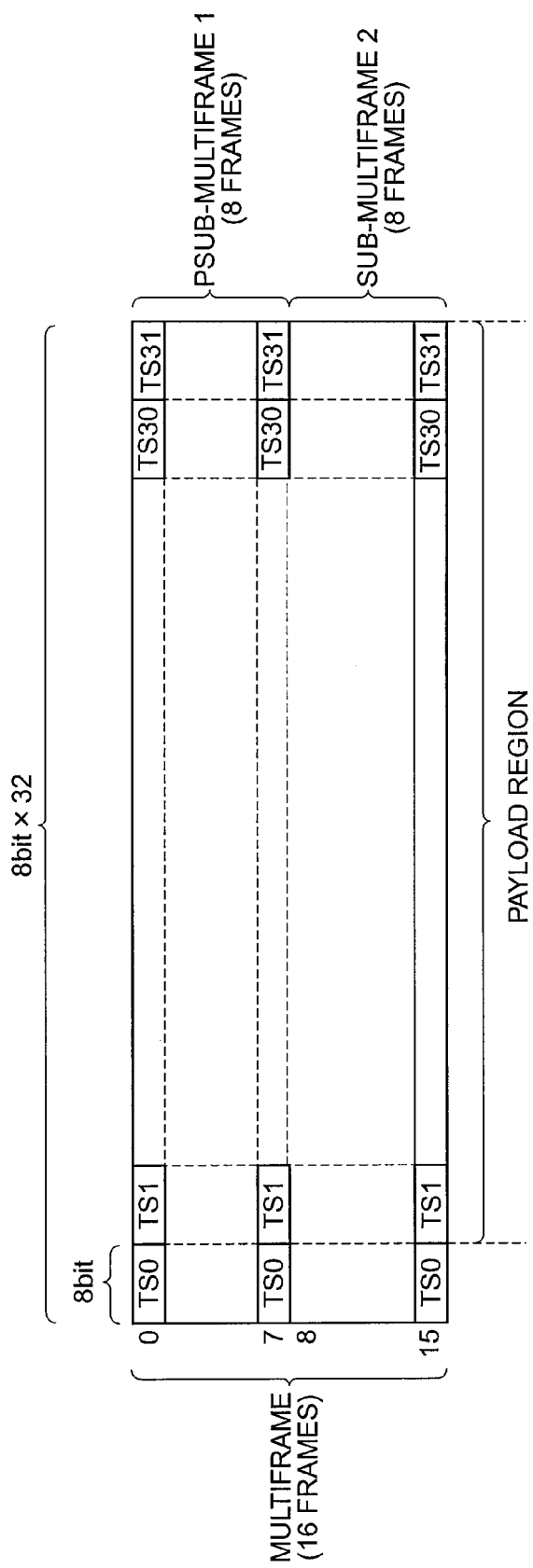
FIG. 2 is a diagram for explaining an E1 frame format standardized in ITU-T G.704.

FIG. 2 shows an E1 frame format standardized in ITU-T G.704, in which each one frame is composed of 32 time slots (TS0 to TS31), one time slot being one byte (=8 bits).

Eight frames make up one sub-multiframe, two sub-multiframes make up one multiframe, and 16 frames make up one multiframe. TS0 in FIG. 2 contains FAS (Frame Alignment Signal) bits, CRC check bits and other bits used for establishment of synchronization and CRC (Cyclic Redundancy Check) calculation. The other regions than the TS0 region constitute a payload region in which the divided packet 201a is multiplexed.

Figure 3:
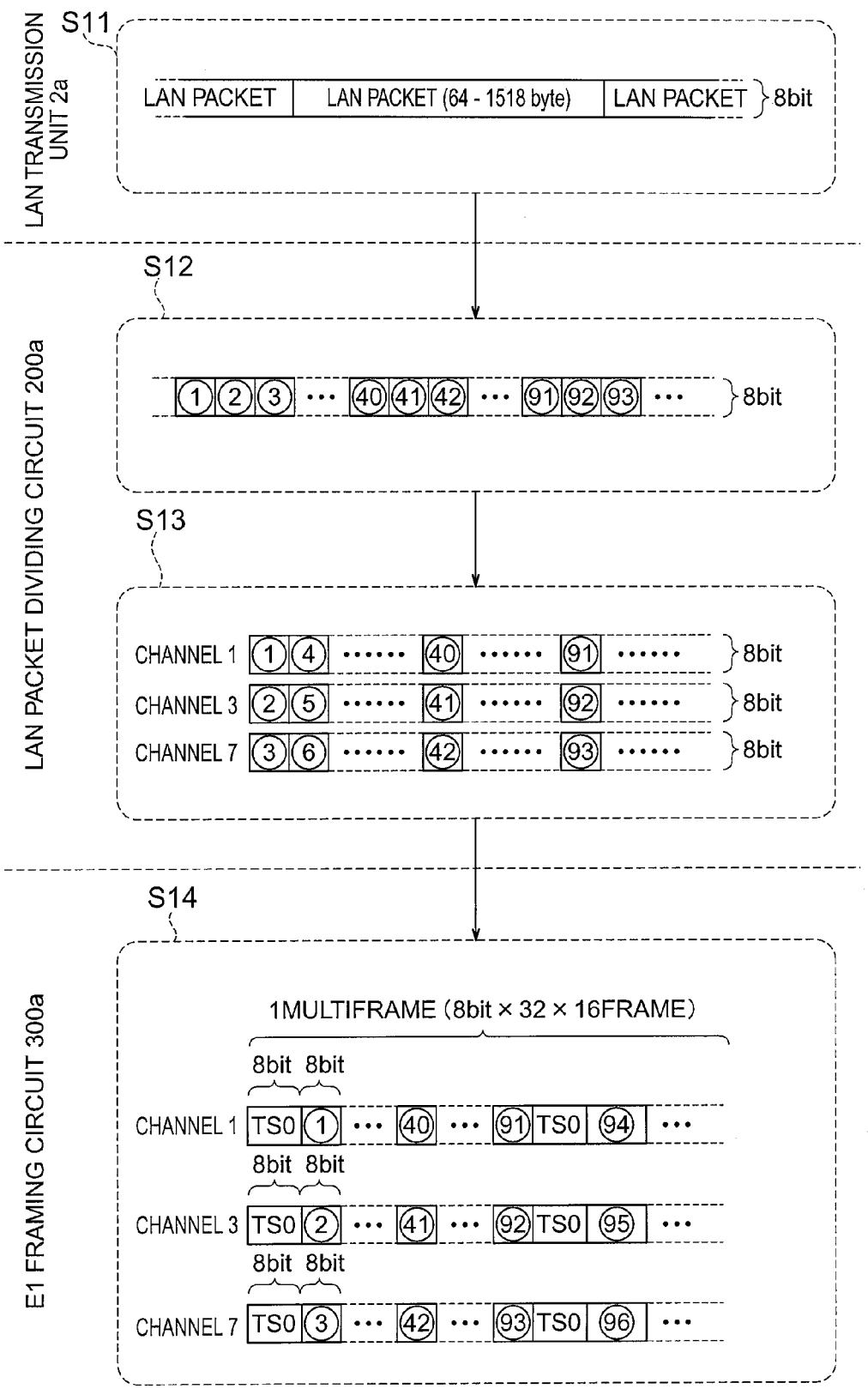
FIG. 3 is a diagram for explaining a method of dividing LAN signals (LAN packet)

LAN Signal (LAN Packet) Dividing Method:

Next, referring to FIG. 3, description will be made of a method of dividing a LAN signal (LAN packet). FIG. 3 shows a flow of processing performed by the transmission device 4a from division of a LAN signal 21a received from the LAN transmission unit 2a and generation of divided packets 201a to multiplexing of the divided packets 201a into E1 frames of a plurality of channels. Although FIG. 1 shows two E1 lines, FIG. 3 shows a case in which there are seven or more E1 lines. The following description will be made of a case in which channel 1, channel 3, and channel 7 of these E1 lines are set as transmission line for the LAN signal 21a.

There is shown in step S11 a LAN signal (LAN packet) 21a which the transmission device 4a receives from the LAN transmission unit 2a. It should be noted that the LAN signal 21a is a signal standardized in IEEE G802.3.

Steps S12 and S13 relate to control performed by the LAN packet dividing circuit 200a of FIG. 1. In step S12, the LAN signal 21a indicated in step S11 is divided in one-byte units to generate divided packets 201a. In step S13, channels to be used as LAN transmission lines are specified on the basis of the LAN mapping information 101a shown in FIG. 1, and the divided packets 201a generated in step S12 are assigned sequentially to the channel 1, channel 3, and channel 7 in ascending order of the channel numbers.

Step S14 relates to control performed by the E1 framing circuit 300a. In step S14, the divided packets 201a assigned to the respective channels in step S13 are multiplexed on payload regions of E1 frames.

By the above-mentioned operations in steps S11 to S14 in FIG. 3, the transmission device 4a is allowed to transmit the LAN signal 21a received from the LAN transmission unit 2a to the E1 lines (in this example, channels 1, 3 and 7) as a plurality of E1 frames. In the same manner, the transmission device 4b is also allowed to transmit the LAN signal 21b received from the LAN transmission unit 2b to the E1 lines as a plurality of E1 frames.

Figure 4:
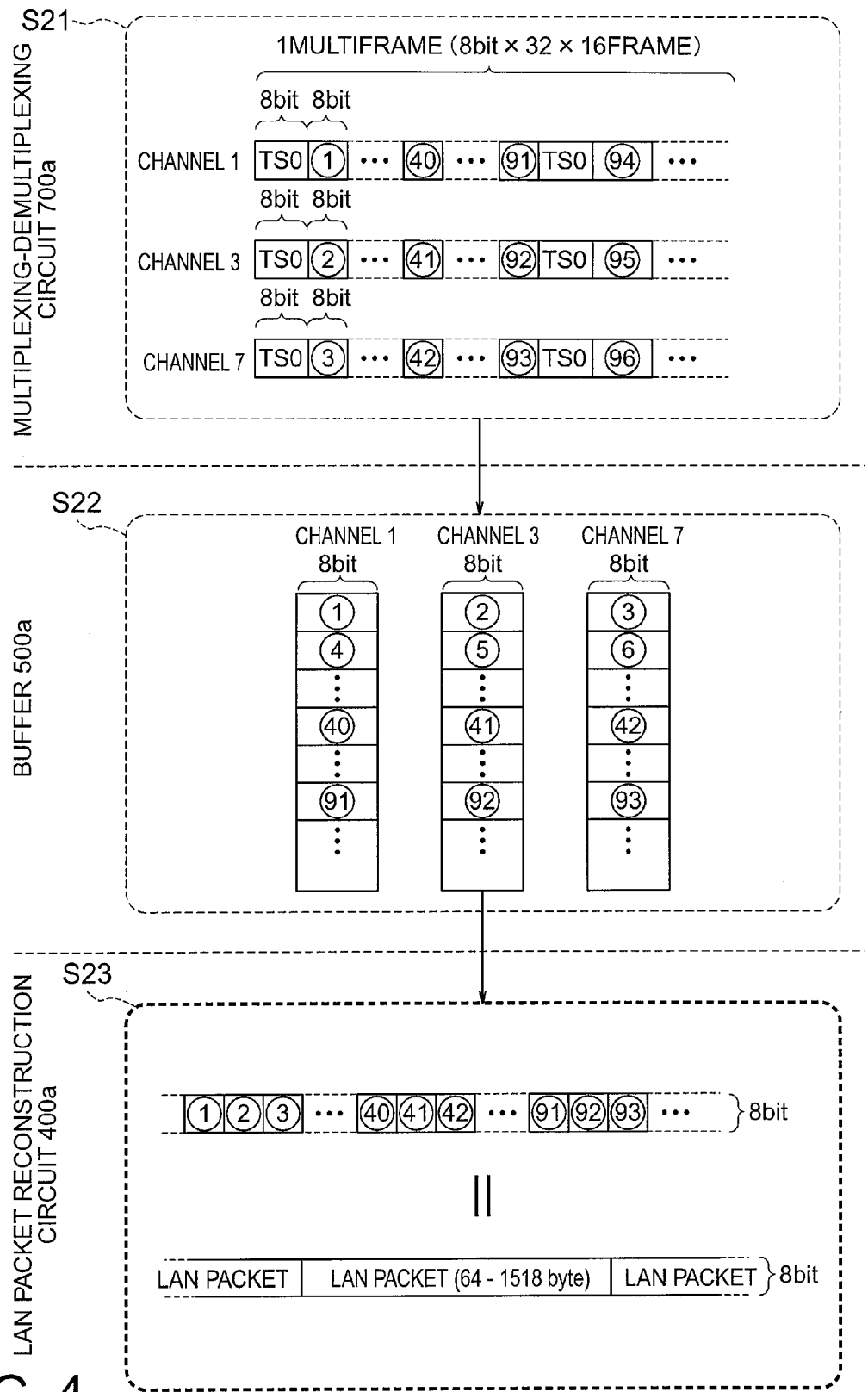
FIG. 4 is a diagram for explaining a method of reconstructing divided packets.

Method of Reconstructing Divided Packets:

Next, referring to FIG. 4, description will be made of a method of reconstructing divided packets. FIG. 4 shows a flow of operation from extraction of data from the payload region excluding the TS0 region in each E1 frame to reconstruction of a LAN signal. Like FIG. 3, description of FIG. 4 will be made of a case in which channels 1, 3, and 7 of E1 lines are set as LAN signal transmission lines.

Step S21 relates to control performed by the multiplexing-demultiplexing circuit 700a of FIG. 1. There is shown in step S21 E1 frames separated from a radio frame. Step S22 relates to control performed by the buffer circuit 500a of FIG. 1. In step S22, there is shown how data is extracted from the payload region excluding the TS0 region of each E1 frame separated in step S21, and the extracted data is written in a buffer circuit 500a provided in each of the channels 1, 3, and 7.

Step S23 relates to control performed by the LAN packet reconstruction circuit 400a of FIG. 1. There is shown in step S23 how the data stored in the buffer circuits 500a of the channels 1, 3, and 7 is read in one-byte units sequentially from the buffer circuits 500a in ascending order of the corresponding channel numbers. It should be noted that a series of the data read out in one-byte units is a LAN signal 21b before the division.

By the operations illustrated in steps S21 to S24 of FIG. 4, the transmission device 4a is thus allowed to reconstruct the LAN signal 21b before the division from the E1 frames received through the E1 lines (in this example, channels 1, 3 and 7). Likewise, the transmission device 4b is also allowed to reconstruct the LAN signal 21a before the division from the E1 frames received through the E1 lines.

As seen from the description above, this invention is capable of transmitting a LAN packet by selecting an arbitrary number n (n is a natural number) of E1 lines from among m (m is a natural number and equal to or greater than n) E1 lines laid between a pair of transmission devices.

Operation and Effects of First Embodiment:

In the transmission system according to the first embodiment as described above, the first transmission device 4a firstly specifies n channels to be used as transmission lines of a LAN signal (LAN packet) 21a. The first transmission device 4a then divides a LAN signal (LAN packet) 21a received from the LAN transmission unit 2a in one-byte units to generate divided packets 201a. The first transmission device 4a then multiplexes the generated divided packets 201a on payload regions of E1 frames transmitted through the specified n channels to generate E1 frame packets 301a. The first transmission device 4a then transmits the E1 frame packets 301a onto the E1 lines 1 and 2.

Based on the E1 frame packets 301a received from the E1 lines 1 and 2, the second transmission device 4b extracts divided packets 201a from the payload regions of the E1 frames 301a and stores the extracted divided packets 201a in the respective buffer circuits of the channels. The second transmission device 4b then specifies n channels to be used as transmission lines for LAN signals (LAN packets) 21b, and reads out, from the buffer circuits, divided packets 201a corresponding to the specified n channels, and reconstructs the LAN signal 21a divided by the first transmission device 4a.

In this manner, the transmission system of this embodiment, using the transmission devices 4a and 4b having a plurality of E1 lines laid therebetween, is enabled to transmit LAN signals (LAN packets) through the existing E1 lines without changing the radio frame structure or radio transmission system. Accordingly, a LAN packet transmission function can be easily added to an existing transmission device capable of transmitting E1 signals, and thus the LAN packet transmission function can be introduced with a reduced cost.

Further, the transmission system of this first embodiment uses 31 time slots as a payload region from among 32 time slots making up an E1 frame. Therefore, the throughput of each of the plurality of E1 lines is 1.984 Mbps, obtained by 2.048 Mbps (E1 signal transmission rate)×(31/32), and the LAN throughput can be set in units of 1.984 Mbps. Thus, the transmission system of the first embodiment is enabled to set the mixture ratio between E1 frame transmission and LAN packet transmission flexibly according to the throughput required for the LAN packet transmission.

Second Embodiment:

Next, a second embodiment of the invention will be described.

A transmission system according to the second embodiment is characterized by setting those radio lines which are not used as E1 frame transmitting radio lines, as LAN packet transmitting radio lines. This makes it possible to utilize the radio lines which are not used as radio lines for transmitting E1 frames, as radio lines for transmitting LAN packets, realizing effective utilization of the radio lines. The transmission system according to the second embodiment will be described in detail with reference to FIG. 1.

The LAN mapping circuit 100a of the transmission device 4a according to the first embodiment determines channels to be used as transmission lines for the LAN signals 21a on the basis of the radio line setting signal 31a from the control terminal 3a, and multiplexes the LAN signals. In contrast, the LAN mapping circuit 100a of the transmission device 4a according to the second embodiment monitors the usage of the channels, and uses channels determined to be unused channels as transmission lines for LAN signals 21a, and generates LAN mapping information 101a so as to multiplex the LAN signals.

Alternatively, the LAN mapping circuit 100a may detect input and loss of E1 frames in the channels. In this case, the LAN mapping circuit 100a determines, on the basis of the detection result, unused channels to be used as transmission lines for LAN signals 21a and generates LAN mapping information 101a so as to multiplex the LAN signals.

In this manner, the transmission system according to the second embodiment is enabled to achieve effective utilization of radio lines by utilizing channels determined to be unused channels as transmission lines for LAN signals 21a.

Third Embodiment:

Next, a third embodiment of the invention will be described.

Figure 5:
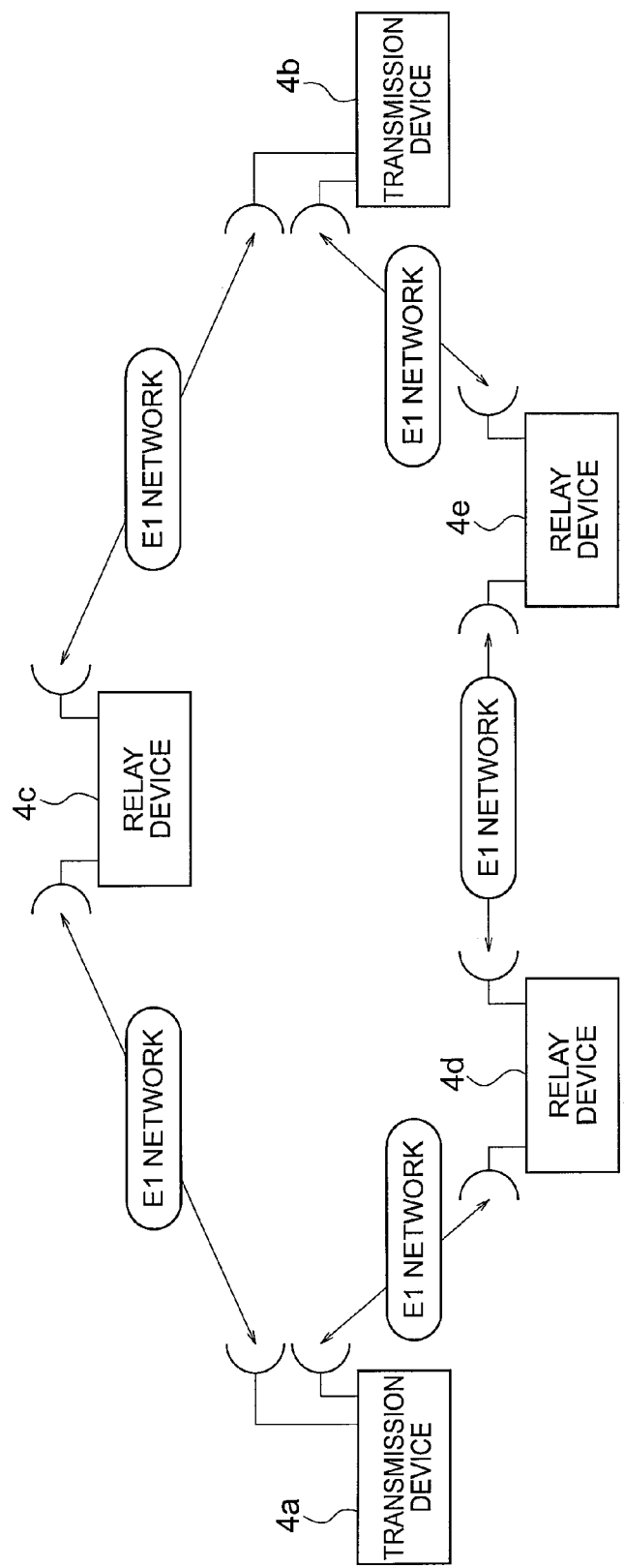
FIG. 5 is a diagram showing an example of a system configuration of a transmission system according to a third embodiment of this invention.
Figure 6:
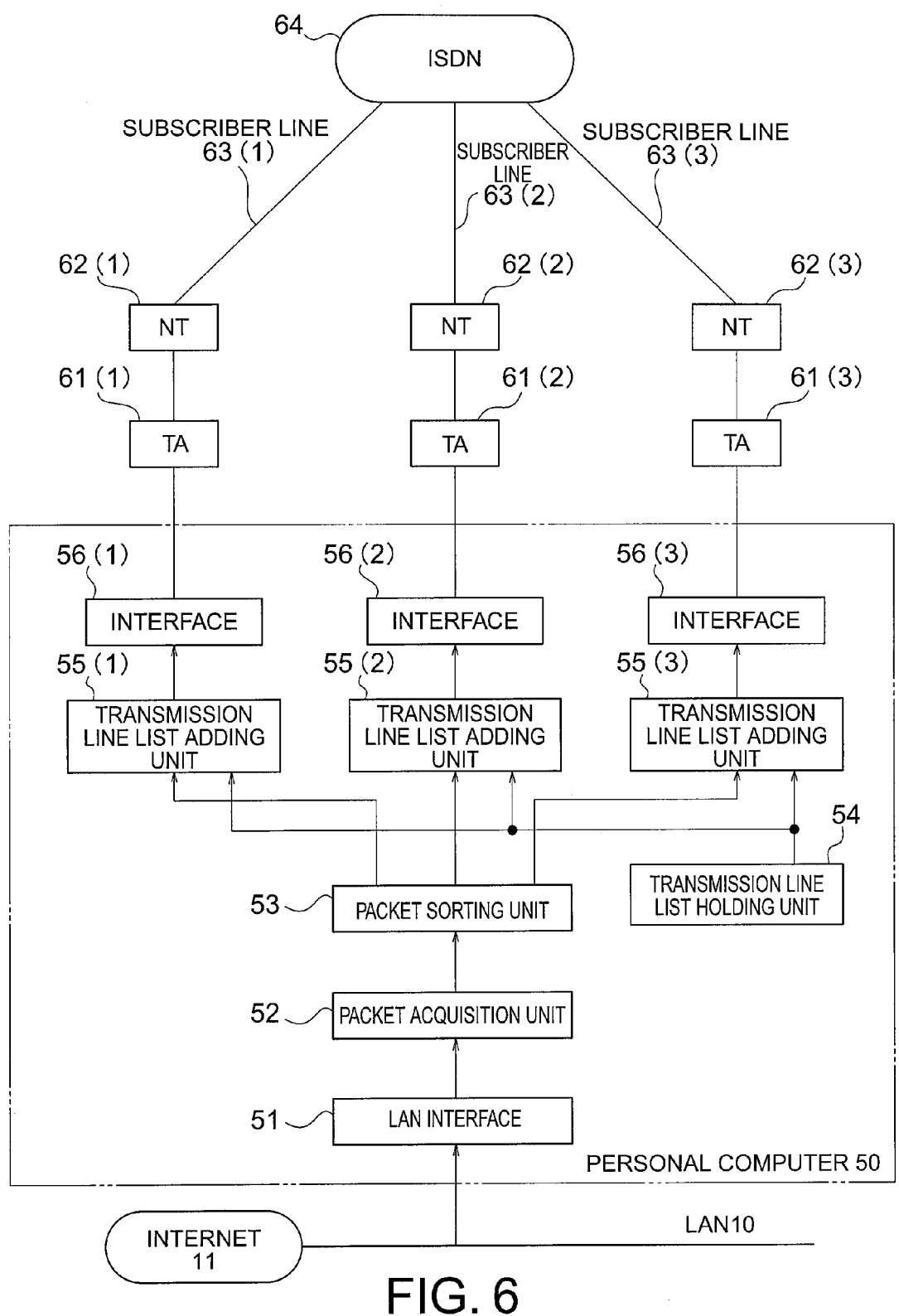
FIG. 6 is a diagram for explaining a transmission method related to this invention.

In the transmission systems according to the first and second embodiments, as shown in FIG. 1, the first transmission device 4a and the second transmission device 4b transmit E1 frames and LAN packets through the E1 lines 1 and 2. In contrast, in a transmission system according to the third embodiment as shown in FIG. 5, a relay device 4c, and relay device 4d and 4e are disposed between the first transmission device 4a and the second transmission device 4b. A plurality of E1 lines (E1 network) are laid between these devices. The transmission system according to the third embodiment is characterized by transmitting E1 frames and LAN packets between these devices. When E1 lines (E1 network) are laid between the devices in this manner, the transmission system according to this third embodiment is also enabled to transmit E1 frames and LAN packets between the devices in the same manner as the transmission system shown in FIG. 1.

Each of the relay device 4c, 4d or 4e may be formed as combination of a pair of transmission devices. Specifically, each of the relay device 4c, 4d or 4e may be formed to have two sets of means (setting means and transmission means) with the same configuration as the transmission device 4a or 4b.

Although the invention has been described with reference to several embodiments thereof, these embodiments are preferred forms of this invention, and the invention is not limited to these embodiments. It is to be understood that various modifications, changes and substitutions will be able to be made by those skilled in the art to conceive alternative embodiments without departing from the spirit and scope of the invention.

For example, although the description of the embodiments has been made in terms of an example of E1 signals, the transmission system of this invention is applicable to all the transmission standards having a specific frame structure such as T1 signals standardized in ITU-T G.704.

Further, the above-described control operations in each of the component devices of the transmission system according to the embodiments of the invention may be carried out by either hardware or software, or combination of hardware and software.

When software is used to carry out the processing, a program in which the processing sequence is recorded can be installed in a memory of a computer incorporated in special-purpose hardware in order to carry out the processing. Alternatively, the processing can be carried out by installing such a program in a general-purpose computer capable of executing various types of processing.

For example, the program can be preliminarily recorded in a hard disk or ROM (Read Only Memory) as a recording medium. Alternatively, the program may be stored (recorded) temporarily or permanently in a removable recording medium. Such a removable recording medium can be provided as so-called package software. Examples of the removable recording medium include a floppy (registered trademark) disk, a CDROM (Compact Disc Read Only Memory), an MO (Magneto-optical) disk, a DVD (Digital Versatile Disk), a magnetic disk, and a semiconductor memory.

The program may be installed into a computer via a removable recording medium as described above. The program may be wirelessly transferred into the computer from a download site. Further, the program may be wiredly transferred to the computer via a network.

The transmission system according to the embodiments of the invention may be designed not only to carry out the processing operations in chronological order as described above in relation to the embodiments but also to carry out the processing operations either in parallel or separately depending on the capacities of the devices performing the processing or as required.

Further, the transmission system according to the embodiments of the invention may be formed as a logical set of a plurality of devices or may be formed such that the devices are located in the same housing.

Industrial Applicability

The transmission device, the transmission system, the transmission method, and the transmission program according to this invention are applicable to transmission systems which are capable of transmitting frames having a specific frame structure and packets using a plurality of radio lines.

This application is the National Phase of PCT/JP2008/067048, filed on Sep. 16, 2008, which is based upon and claims the benefit of priority from Japanese Patent Application No. 2007-149708, filed Sep. 26, 2007, the disclosure of which is incorporated herein in its entirety by reference.

The invention claimed is:

1. A transmission device for receiving a frame having a specific frame structure and a packet from first and second units, respectively, to transmit the frame and the packet to a counterpart different from the first and second units with the use of a plurality of radio lines connected to the counterpart, the transmission device comprising:
   a first input portion that receives the frame from the first unit;
   a second input portion that receives the packet from the second unit;
   a setting portion that sets each one of the radio lines either as a radio line for transmitting the frame received by the first input portion or as a radio line for transmitting the packet received by the second input portion; and
   a transmission portion that transmits the frame and the packet to the counterpart with the use of the radio lines according to information set by the setting portion.

2. The transmission device as claimed in claim 1, wherein the setting portion determines a radio line to be used for transmitting the packet and sets the other radio line(s) as the frame transmitting radio line(s).

3. The transmission device as claimed in claim 1, wherein the transmission portion has switching portion that switches the radio line either to the frame transmitting radio line or to the packet transmitting radio line in accordance with the information set by the setting portion.

4. The transmission device as claimed in claim 3, wherein:
   the switching portion is connected to a frame transmission portion for transmitting the frames and a packet transmission portion for transmitting the packets; and
   on the basis of the information set by the setting portion, the switching portion transmits the frame transmitted from the frame transmission portion onto the radio line for transmitting the frame, and transmits the packet of the specific frame structure transmitted from the packet transmission portion onto the packet transmitting radio line.

5. The transmission device as claimed in claim 4, wherein the packet transmission portion comprises:
   a dividing portion that divides a packet into a plurality of divided packets; and
   a framing portion that multiplexes the divided packets divided by the dividing portion into a frame to generate a packet of a specific frame structure, and
   the packet of the specific frame structure is transmitted to the switching portion.

6. The transmission device as claimed in claim 5, wherein:
   the dividing portion specifies channels to be used as the packet transmitting radio line on the basis of the information set by the setting portion and assigns the divided packets to the specified channels; and
   the framing portion multiplexes the divided packets assigned to the channels into a frame to generate a packet of a specific frame structure.

7. The transmission device as claimed in claim 3, wherein on the basis of the information set by the setting portion, the switching portion transmits a frame transmitted via the frame transmitting radio line from the counterpart to the frame transmission portion, and transmits a packet of a specific frame structure transmitted via the packet transmitting radio line from the counterpart to the packet transmission portion.

8. The transmission device as claimed in claim 5, wherein the packet transmission portion comprises:
   a storing portion that extracts divided packets from the packet of the specific frame structure transmitted from the switching portion to store the extracted divided packets; and
   a reconstruction portion that reconstructs a packet based on the divided packets stored in the storing portion.

9. The transmission device as claimed in claim 8, wherein:
   the storing portion stores the divided packets for the respective channels;
   the reconstruction portion specifies channels to be used in the packet transmitting radio line on the basis of the information set by the setting portion, reads out the divided packets corresponding to the specified channels from the storing portion, and reconstructs a packet.

10. The transmission device as claimed in claim 1, wherein the setting portion sets a radio line not used as the frame transmitting radio line as the packet transmitting radio line.

11. A transmission system formed by connecting a first transmission device and a second transmission device via a plurality of radio lines, each of the transmission devices used for receiving a frame having a specific frame structure and a packet from first and second units, respectively, to transmit the frame and the packet to the other transmission device with the use of the plurality of radio lines, the transmission devices each comprising:

a first input portion that receives the frame;
a second input portion that receives the packet;
a setting portion that sets each one of the radio lines either as a radio line for transmitting the frame received by the first input portion or as a radio line for transmitting the packet received by the second input portion; and
a transmission portion that transmits the frame and the packet to the other transmission device using the radio lines in accordance with the information set by the setting portion.

12. The transmission system as claimed in claim 11, comprising at least one relay device between the first transmission device and the second transmission device, wherein:

the relay device is connected to the first transmission device and the second transmission device through the plurality of radio lines, respectively, and
the relay device has the setting portion and the transmission portion.

13. A transmission method for receiving a frame having a specific frame structure and a packet from first and second units at first and second input portions, respectively, to transmit the frame and the packet to a counterpart different from the first and second units with the use of a plurality of radio lines connected to the counterpart, the method comprising:

a setting step for setting each one of the radio lines either as a radio line for transmitting the frame received by the first input portion or as a radio line for transmitting the packet received by the second input portion; and
a transmission step for transmitting the frame and the packet to the counterpart with the use of the radio lines in accordance with the information set in the setting step.

14. The transmission method as claimed in claim 13, wherein in the setting step, a radio line to be used for transmitting the packet is determined, and the other radio line(s) is/are set as the frame transmitting radio line(s).

15. The transmission method as claimed in claim 13, wherein the transmission step further comprises:

a dividing step of dividing a packet into a plurality of divided packets; and
a framing step of multiplexing the divided packets divided in the dividing step into a frame and generating a packet of a specific frame structure.

16. The transmission method as claimed in claim 15, wherein:

in the dividing step, channels to be used in the packet transmitting radio line is specified on the basis of information set in the setting step, and the divided packets are assigned to the specified channels; and
in the frame step, the divided packets assigned to the channels are multiplexed into a frame and a packet of a specific frame structure is generated.

17. The transmission method as claimed in claim 15, wherein the transmission process further comprises:

a packet transmission step of transmitting the packet of the specific frame structure generated in the framing step via the switching step;
a storing step of extracting the divided packets from the packet of the specific frame structure transmitted via the switching step, and storing the extracted divided packets; and
a reconstruction step of reconstructing a packet on the basis of the divided packets stored in the storing step.

18. The transmission method as claimed in claim 13, wherein the transmission step comprises a switching step of switching the radio line either to the frame transmitting radio line or to the packet transmitting radio line in accordance with the information set in the setting step.

* * * * *